Patented May 25, 1954

2,679,497

UNITED STATES PATENT OFFICE 2,679,497

TREATMENT OF ROSIN SOAPS AND USE OF TREATED ROSIN SOAPS IN EMULSION POLYMERIZATION

Carl A. Uraneck, Borger, and Spencer H. Landes, Phillips, Tex., assignors to Phillips Petroleum Company, a corporation of Delaware No Drawing. Application July 14, 1949, Serial No. 104,808

18 Claims. (Cl. 260—94.2)

This invention relates to a treatment of rosin soaps, and to the use of resulting treated rosin soaps in emulsion polymerization of unsaturated organic monomeric materials. In one embodiment this invention relates to an improved process for producing synthetic rubber.

It is well known in the art that a variety of emulsifying agents may be employed when carrying out emulsion polymerization reactions. It is also recognized that rosin soaps are preferred in many instances to other types of emulsifying agents. When so employed rosin acids remain in the product and their presence is known to give improved properties, particularly flex life and tack.

The use of rosin soaps as emulsifiers for polymerization reactions has been limited on account of their lack of activity or, to state it differently, the retarding effect they exert when so employed. While certain of the rosin soaps are sufficiently active to be of practical value as emulsifying agents in polymerization reactions, others appear to inhibit polymerization.

We have now discovered a method for the treatment of rosin soaps whereby those materials which have heretofore not been applicable as emulsifying agents for polymerization reactions are now made operable and other rosin soaps which are already known to function more or less satisfactorily are rendered still more active. The treatment comprises an activation procedure in which the rosin soap is contacted with a hypohalogen-type compound, such as hypohalogen acid or its alkali metal salt, under such conditions as to effect the desired increase in activity. Our treatment is applied not only to soaps prepared from acids, and mixtures of acid, found in natural rosins, but also from acids and acid mixtures resulting from the well known disproportionation of acids present in natural rosin. These include the soaps of "Rosinyl" and "Hyex" acids discussed in Littmann 2,154,629.

An object of this invention is to effect an improved polymerization of unsaturated organic compounds while dispersed in an aqueous medium.

A further object of this invention is to obtain an improved emulsion polymerization of an unsaturated organic material when a rosin soap is used as an emulsifying agent.

Another object of this invention is to improve the properties of soaps of rosin acids, and of soaps of derivatives of rosin acids, as indicated by improvements when these are used in emulsion polymerization.

Further objects and advantages of this invention will become apparent, to one skilled in the art, from the accompanying disclosure and discussion.

According to one embodiment of this invention, a rosin soap is first prepared from the corresponding acid by neutralization of the acid with an aqueous solution of an alkali metal hydroxide such as sodium, potassium, or lithium hydroxide, or with an aqueous solution of ammonia. Of the hydroxides employed, those of sodium and potassium are most generally preferred. The resulting rosin soap solution is then treated with a hypohalogen-type compound, such as a hypohalogen acid or the corresponding alkali metal salt. Examples of the treating materials most frequently employed are hypochlorous and hypobromous acids and the corresponding sodium and potassium salts.

The temperature employed when treating a rosin soap with a hypohalogen compound is generally room temperature, i. e. about 65 to 80° F. In some instances greater activation appears to be achieved when lower temperatures are used. A suitable reaction temperature is usually found between 30 and 220° F.

The amount of hypohalogen compound employed in the treatment of rosin soap will vary with the material to be treated. Generally it will be in the range from 0.05 to 6 millimols per one part of rosin soap which, in the case of potassium abietate, is 2.94 millimols. The amount of hypohalogen compound most generally preferred will be in the range from 0.2 to 2 millimols per part of rosin soap employed.

The above described procedure for rosin soap activation represents only one embodiment of the invention. Numerous variations may be introduced which, in some instances, have a still further activating effect on the soap. For example, after treatment of the rosin soap with the hypohalogen compound, it is sometimes desirable to liberate the rosin acid by addition of an acid, such as hydrochloric acid, and then to separate and subsequently reconvert the liberated rosin acid to a soap by the addition of an alkali metal hydroxide, such as sodium or potassium hydroxide. Further activation is accomplished in some instances by this treatment.

Rosin soaps, which are ordinarily not applicable for use as emulsifying agents in polymerization reactions, may be made operable when treated according to the activating procedure herein described. In some recipes, particularly when operating at low temperatures, it has frequently been necessary to use emulsifiers other than rosin soaps in order to obtain satisfactory conversion rates. With the activating treatment of this invention the applicability of rosin soaps has been increased and they may now be employed to give satisfactory conversion rates in polymerization recipes and under conditions where it was once necessary to use other emulsifying agents. Inexpensive rosin soaps which have been considered of little value in polymerization work, on account of the inhibiting effect they exert on the reactions, are now made operable by this activating treatment. The invention therefore has certain economic advantages.

In general, any of the commercially avialable rosin acids, rosin acid mixtures, and hydrogenated and disproportionated acid products thereof, as previousily discussed herein, can be employed when operating according to the process of this invention. The soap is first prepared by neutralization of the acid and this, in turn, is subjected to the activating treatment in the manner described. Materials of the type which are more usually employed include commercial abietic acid, hydrogenated rosin acids, tall oils which are either the crude or refined materials, acid from wood rosins, and the like. The soaps of disproportionated rosin acids, which are known to be applicable as emulsifiers, are rendered more active when treated according to this process.

Soaps which have been activated according to the method of this invention may be employed alone as emulsifying agents in polymerization reactions, or they may be used in admixture with various other emulsifying agents such as fatty acid soaps, alkyl and aryl sulfates and sulfonates, and the like. They are applicable in all kinds of emulsion polymerization systems such as those of the GR–S type, in which a persulfate is the reaction initiator, or in various activated recipes such as the peroxide-redox recipes, the diazo thioether-ferricyanide-mercaptan recipe, the hydroperoxide-amine recipes, etc. The invention is particularly useful in those recipes in which an oxidant is used together with an activator-reductant, especially when the oxidant is an organic hydroperoxide, or alkali metal salt thereof, and the activator-reductant is a composition comprising an alkali metal pyrophosphate-ferrous salt composition, with or without an organic reductant such as a reducing sugar, or the activator-reductant is a diamino compound, such as one or more of hydrazine, ethylenediamine, diethylene-triamine, ethylenemethylethylene-triamine, tetraethylenepentamine, and the like. These compounds have the general formula

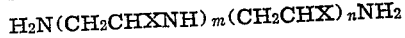
$H_2N(CH_2CHXNH)_m(CH_2CHX)_nNH_2$ where each X is of the group consisting of hydrogen and methyl, $m$ is an integer between 0 and 8, inclusive, and $n$ is an integer of the group consisting of 0 and 1 and is 1 when $m$ is greater than 0. In such recipes the amine-type compound used appears to act both as a reductant and as an activator, and no other activating ingredients, such as compounds of polyvalent-multivalent metals, or reducing ingredients, such as a reducing sugar, need be present in order to obtain satisfactory and rapid polymerization of the monomeric material, even at subfreezing temperatures. The amount of amine-type compound used to obtain optimum results also is dependent upon other ingredients in the recipe. Preferred results are usually obtained with between 0.1 to 5 parts by weight, per 100 parts of monomeric material, of the amine-type compound. In other recipes a composition is used which comprises the compound which is an oxidation catalyst, or activator, and another different compound which is a reductant. The oxidation catalyst is generally selected from a group of materials consisting of compounds of metals such as iron, manganese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable polyhydroxy compound. Compounds frequently employed in this capacity are glucose, levulose, sorbose, invert sugar, and the like. The multivalent metal ion of the oxidation catalyst can easily and readily pass from a low valence state to a higher valence state, and vice versa. Sometimes this compound, when present in its lower valence state, can function in the dual role of reductant and oxidation catalyst. One commonly used oxidation catalyst is an iron pyrophosphate, and is separately made up in aqueous solution from a ferrous salt, such as ferrous sulfate, and a pyrophosphate of an alkali metal, such as sodium or potassium.

In effecting emulsion polymerization of a monomeric material, particularly when a batch-type or semi-batch-type operation is carried out, the reactor is usually first charged with the aqueous emulsifying medium, which contains the desired emulsifying agent, and the monomeric material is then admixed with agitation of the contents. At the same time a reaction modifier, such as a mercaptan, is also included, usually in solution in at least a part of the monomeric material. An activator solution and an oxidant are separately added to the reaction mixture, and reaction then proceeds. A preferred manner of adding these two constituents is usually to have the activator solution incorporated in the aqueous medium prior to addition of the monomeric material, and to add the oxidant as the last ingredient. Sometimes, however, satisfactory polymerization results can be obtained when this procedure is reversed. It is also sometimes the practice to add portions of one or the other of the activator solutions and oxidant intermittently, or continuously, during the course of the reaction. If the operation is carried out continuously, streams of the various ingredients are admixed in somewhat the same order prior to their final introduction into the polymerization reaction zone.

As previously stated, it is usually desirable that the multivalent metal be present in its lower valence state. With some recipes, it is unnecessary to include an organic reducing agent either in the activator solution or in the polymerization mixture. However, particularly at temperatures above 32° F., a faster reaction is sometimes obtained with some recipes when a small amount of an organic reducing agent, such as a reducing sugar, is included in the polymerization recipe, and it is frequently more desirable to incorporate this in the reaction system by first including it in the activator solution along with the other ingredients. When the multivalent ion is present in its higher valence state, it is usually necessary to include in the activator solution an organic reducing agent. As a result the multivalent ion will be partially reduced and a substantial amount of the multivalent ion will be present in its lower valence state when the activator solution is ready for addition to the polymerization mixture.

It is usually preferred that the multivalent ion be iron, and the activator solution may be prepared from any of the readily available soluble iron salts, such as ferrous sulfate, ferric sulfate, ferrous nitrate, and the like. A pyrophosphate of sodium or potassium is also usually used in preparing the activator solution. Apparently the ferrous salt and the pyrophosphate interreact to form some kind of a complex compound. Temperatures which are employed for carrying out these reactions may vary from −40 to 160° F.

The pH of the treated emulsifiers can vary over a wide range, that is, satisfactory polymerization rates are obtained when emulsifiers are employed which are in the pH range from 8 to 13. The optimum pH, however, is generally within the range from 9 to 11.5.

When a ferrous pyrophosphate activator is used, it is preferably prepared by admixing a ferrous salt, such as ferrous sulfate, with a pyrophosphate of an alkali metal, such as sodium or potassium, and water and heating this mixture, preferably for the length of time required for maximum activity. A reaction occurs between the salts, as evidenced by the formation of a grayish-green precipitate. When preparing the activator the mixture is generally heated above 120° F., for variable periods depending upon the temperature. For example, if the mixture is boiled, a period of twenty minutes or less is sufficient to produce the desired activity, and the time of boiling may even be as low as 30 seconds. One convenient method of heating the activator is by means of an air oven or other suitable arrangement for controlling the surrounding temperature. If the temperature of the oven is set at 140° F., for example, a period of heating ranging from 30 to 90 minutes may be employed, the time being governed by the temperature desired in the activator. Generally a period of about 40 minutes is required to raise the temperature of the activator mixture to 140° F. Prior to heating the activator mixture the vessel is usually flushed with an inert gas such as nitrogen. In general it is preferred to heat the mixture below the boiling point, say at a temperature around 130 to 170° F.

In cases where the activator is prepared just prior to use, it is generally employed in the form of an aqueous dispersion as described above. However, the solid activator may be isolated and the crystalline product used, and in this form it is preferred in some instances. Subsequent to heating the activator mixture, it is cooled to around room temperature and the solid material separated by centrifugation, filtration, or other suitable means, after which it is dried. Drying may be accomplished in vacuo in the presence of a suitable drying agent, such as calcium chloride, and in an inert atmosphere such as nitrogen. When using this crystalline product in emulsion polymerization reactions, it is generally charged to the reactor just prior to introduction of the butadiene. This crystalline material is believed to be a sodium ferrous pyrophosphate complex, such as might be exemplified by the formula $2Na_2FeP_2O_7 \cdot Na_4P_2O_7$, or perhaps $Na_2FeP_2O_7$. In any event the complex, whatever its composition, is only slightly soluble in water and is one active form of ferrous ion and pyrophosphate which can be successfully used in our invention. It may be incorporated in the polymerization mixture as such, or dissolved in sufficient water to produce solution. Other forms of multivalent metal and pyrophosphate may also be used, so long as there is present in the reacting mixture a soluble form of a multivalent metal, capable of existing in two valence states and present primarily in the lower of two valence states, and a pyrophosphate.

The amounts of activator ingredients are usually expressed in terms of the monomers charged. The multivalent metal should be within the range of 0.10 to 3 millimols per 100 parts by weight of monomers, with 0.2 to 2.5 millimols being generally preferred. The amount of pyrophosphate should be within the range of 0.10 to 5.6 millimols based on 100 parts by weight of monomers; however, the narrower range of 0.2 to 2.5 millimols is more frequently preferred. The mol ratio of ferrous salt to alkali metal pyrophosphate can be between 1:0.2 and 1:3.5, with a preferred ratio between 1:0.35 and 1:2.8.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxy styrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 180 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 per cent, or more, of the alcohol present be in the aqueous phase. A high-boiling alcohol such as glycerine is difficult to recover from the resulting serum; a low-boiling alcohol such as methanol is easily removed and frequently preferred. Other low-boiling alcohols such as ethanol, however, are frequently too soluble in the liquid monomeric material to permit satisfactory operation. If the resulting latex tends to gel at low reaction temperatures, a larger proportion of aqueous phase should be used. It is generally preferred that the emulsion be of an "oil in water" type, with the ratio of aqueous medium to monomeric material between about 1.5:1 and about 2.75:1, in parts by weight. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. Usually 50 to 85 per cent of the monomeric material is polymerized.

The pH of the aqueous phase may be varied over a rather wide range without producing deleterious effects on the conversion rate or the properties of the polymer. In general the pH may be within the range of 9.0 to 11.8, with the narrower range of 9.5 to 10.5 being most generally preferred.

The mercaptans applicable in this invention are usually alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

Advantages of this invention are illustrated by the following examples. The reactants, and their proportions, and the other specific ingredients of the recipes are presented as being typical and should not be construed to limit the invention unduly.

Example I

Soaps prepared from the following commercially available rosin acids were activated by treatment with potassium hypochlorite:

Neofat D-242: a hydrogenated oleic acid-rosin acid mixture.
Neofat S-142: refined hydrogenated tall oil containing 12 per cent rosin acid and 88 per cent fatty acid.
Indusoil: a mixture containing 55-60 per cent fatty acids, 34-38 per cent rosin acids, and 6-10 per cent sterols, higher alcohols, etc.
Tallex: a commercial grade of abietic acid crystals.

Treatment with potassium hypochlorite was effected in the following manner: 5 parts of each acid in 100 parts water was first neutralized with potassium hydroxide to form the potassium soap and a solution of potassium hypochlorite added in an amount such that 4 millimols was introduced per 5 parts of soap. The treatment was carried out at room temperature, i. e. about 75° F. The pH of the treated emulsifiers ranged from 9.5 to 10.5, thus: Neofat D-242, 10.5; Neofat S-142, 9.9; Indusoil, 10.4; Tallex, 9.5. All parts are parts by weight.

A series of polymerization runs was carried out using both treated and untreated emulsifiers. The recipe was as follows:

| | Parts by weight |
|---|---|
| Butadiene | 70 |
| Styrene | 30 |
| Water | 180 |
| Emulsifier | 5 |
| Mercaptan blend [1] | 0.25 |
| Cumene hydroperoxide | 0.083 |
| Activator: | |
| $FeSO_4 \cdot 7H_2O$ | 0.14 |
| $K_4P_2O_7$ | 0.165 |

[1] A blend of tertiary $C_{12}$, $C_{14}$, and $C_{16}$ aliphatic mercaptans in a ratio of 3:1:1 parts by weight.

The activator composition was prepared by heating a mixture of the ferrous sulfate, potassium pyrophosphate, and 10 parts water at 140° F. for 50 minutes. Polymerization was effected at 41° F. according to the conventional procedure. The data which follow show the conversion reached after 16 hours with both treated and untreated emulsifiers.

| Emulsifier | Treatment | Conversion, percent, 16 hours |
|---|---|---|
| Neofat D-242 | none | 14.0 |
| Do | KOCl | 37.2 |
| Neofat S-142 | none | 46.8 |
| Do | KOCl | 64.5 |
| Indusoil | none | 17.3 |
| Do | KOCl | 39.2 |
| Tallex | none | 8.8 |
| Do | KOCl | 31.7 |

Example II

Separate portions of an aqueous solution of potassium abietate (formed from KOH and Tallex) were treated with an aqueous solution of sodium hypochlorite, 5.9 per cent, of potassium hypochlorite, 9.05 per cent, and a commercial solution of 4.32 per cent sodium hypochlorite (Clorox), each in an amount such as to have the quantity of treating agent indicated hereinafter. Treatment was effected at room temperature. These emulsifiers were then employed in the following polymerization recipe:

| | Parts by weight |
|---|---|
| Butadiene | 70 |
| Styrene | 30 |
| Water | 180 |
| Potassium abietate | 5 |
| Cumene hydroperoxide, 100% | 0.167 |
| Mercaptan blend [1] | 0.25 |
| Activator: | |
| $FeSO_4 \cdot 7H_2O$ | 0.278 |
| $K_4P_2O_7$ | 0.33 |

[1] See Example I.

The activator composition was prepared as in Example I. Polymerization was effected at 41° F. using the conventional technique. In all cases 5 parts potassium abietate (14.7 millimols) was used but the amount of treating agent was varied. The following table shows the type and quantity of treating agent and the time-conversion data:

| Pretreatment of Potassium Abietate | | Emulsifier 5 Parts (14.7 Millimols) | Conversion, Percent | |
|---|---|---|---|---|
| Treating Agent | | | | |
| Type | Millimols | | 16 Hrs. | 24 Hrs. |
| NaOCl | 4.0 | K abietate | 58 | 72 |
| KOCl | 3.0 | do | 55 | 76 |
| KOCl | 4.0 | do | 62 | 77 |
| KOCl | 5.0 | do | 62 | 80 |
| Clorox | 3.0 | do | 50 | 71 |
| Do | 4.0 | do | 49 | 68 |
| Do | 5.0 | do | 48 | 67 |
| None | | do | 8 | |

Example III

Variable amounts of sodium hypochlorite solutions were employed in the treatment of aqueous solutions containing 5 parts potassium abietate which was used as the emulsifier in a series of polymerization runs carried out at 41° F. The recipe of Example II was followed. The results are shown below.

| Emulsifier | Conversion, Percent, 16.3 Hours |
|---|---|
| 5 parts K abietate+0.2 millimol NaOCl | 19.9 |
| 5 parts K abietate+0.4 millimol NaOCl | 21.9 |
| 5 parts K abietate+0.8 millimol NaOCl | 23.6 |
| 5 parts K abietate+1.2 millimol NaOCl | 30.1 |
| 5 parts K abietate+2.0 millimol NaOCl | 45.9 |
| 5 parts K abietate+4.0 millimol NaOCl | 58.2 |
| 5 parts K abietate+8.0 millimol NaOCl | 51.2 |
| 5 parts K abietate, untreated | 8 |

Example IV

An aqueous solution containing about 5 per cent of abietic acid was neutralized with KOH, and was then mixed with a 5.9 per cent aqueous solution of sodium hypochlorite in such amount that 4.0 millimols of the hypochlorite was used per 5 parts by weight (14.7 millimols) of the potassium abietate soap. Potassium hydroxide was added to each of several portions of the treated emulsifier to vary the pH from 8.8 to 11.6. These portions were employed in a series of polymerization runs at 41° F. using the recipe given in Example II. The results were as follows:

| pH of Emulsifier | Conversion, Percent, 15.5 Hours |
|---|---|
| 8.8 | 47 |
| 9.5 | 51 |
| 10.1 | 55 |
| 11.0 | 55 |
| 11.6 | 51 |

Example V

A sample of aqueous rosin soap containing a mixture of the potassium salts of dehydro-, dihydro- and tetrahydroabietic acids (Dresinate 214) was treated with aqueous sodium hypochlorite in such amount that 4 millimols of the hypochlorite was used per 5 parts of the soap. A series of three polymerizations was carried out at 41° F., according to the recipe given in Example II except that the emulsifier was varied. In the first run the rosin soap was treated with sodium hypochlorite as described above, in the second run the hypochlorite treated rosin soap was treated further with hydrochloric acid to liberate the rosin acid and the acid so liberated was neutralized with potassium hydroxide, and in the third run an untreated sample of the rosin soap was employed as the control. The data are tabulated below.

| Run No. | Conversion, Percent, at— | |
|---|---|---|
| | 7.0 Hrs. | 15.5 Hrs. |
| I. 5 parts Dres. 214 treated with NaOCl | 52 | 72 |
| II. 5 parts Dres. 214 treated, liberated, and neutralized | | 81 |
| III. 5 part untreated Dres. 214 | 40 | |

Further improvement is realized by adding hydrochloric acid to the sodium hypochlorite treated rosin soap and reconverting the liberated rosin acid to the soap by neutralization with potassium hydroxide as shown by the data.

Example VI

Aqueous solutions containing five parts by weight each of the potassium soaps of Indusoil, Neofat D-242, and Tallex (see Example I for definitions of these commercial products) were treated with a solution containing 4 millimols of potassium hypochlorite and employed as emulsifiers in the following basic polymerization recipe:

| | Parts by weight |
|---|---|
| Butadiene | 70 |
| Styrene | 30 |
| Water | 180 |
| Emulsifier | 5 |
| Mercaptan blend [1] | 0.25 |
| Cumene hydroperoxide | 0.083 |
| Activator: | |
| $FeSO_4.7H_2$ | 0.14 |
| $K_4P_2O_7$ | 0.165 |

[1] See Example I.

Runs were made with the untreated emulsifiers, with the treated emulsifiers in the above recipe, and with the treated emulsifiers in the above recipe to which either 0.1 part dihydroxyacetone, or 1.0 part dextrose, digested with potassium hydroxide was added. When dihydroxyacetone was used, it was dissolved in a small amount of water and added to the soap solution. In cases where dextrose was employed, 1.0 part of dextrose was digested with 0.04 part potassium hydroxide by heating an aqueous solution of the mixture for five to ten minutes at 176° F. This mixture was then added to the soap solution.

Polymerization was effected at 41° F. according to the conventional procedure. The results are herewith presented.

| Potassium Salt of— | Conversion, Percent 16.5 Hours |
|---|---|
| Untreated Indusoil | [1] 17.3 |
| Treated Indusoil | 52 |
| Treated Indusoil+0.1 part dihydroxyacetone | 57 |
| Treated Indusoil+1.0 part digested dextrose | 57 |
| Untreated Neofat D-242 | [1] 14.0 |
| Treated Neofat D-242 | 45 |
| Treated Neofat D-242+0.1 part dihydroxyacetone | 53 |
| Treated Neofat D-242+1.0 part digested dextrose | 46 |
| Untreated Tallex | [1] 8.8 |
| Treated Tallex | 29 |
| Treated Tallex+0.1 part dihydroxyacetone | 40 |
| Treated Tallex+1.0 part digested dextrose | 45 |

[1] 16-hour conversions.

*Example VII*

Potassium abietate (prepared from a commercial grade of abietic acid crystals known as Tallex) was employed as the emulsifier, with and without potassium hypochlorite treatment, in the following basic recipe:

| | |
|---|---|
| Butadiene | 72 parts by weight. |
| Styrene | 28 parts by weight. |
| Water | 180 parts by weight. |
| Potassium abietate | 4.7 parts by weight. |
| Hydroperoxide | Variable (0.67 millimol). |
| Mercaptan blend [1] | 0.24 part by weight. |
| Activator: | |
| $FeSO_4.7H_2O$ | 0.14 part by weight. |
| $K_4P_2O_7$ | 0.165 part by weight. |
| Dextrose, KOCl treated | 0.25 part by weight. |

[1] See Example I.

The activator was prepared by heating the ferrous sulfate and potassium pyrophosphate, dissolved in water, for 50 minutes at 140° F. The dextrose, dissolved in water, was heated with potassium hypochlorite at a temperature of 122 to 140° F. for a period of 30-50 minutes, one mol of hypochlorite being used per two mols of dextrose. The treated dextrose was charged to the soap solution. Otherwise the conventional procedure was followed. Polymerization was carried out at 41° F.

A series of runs was made using different hydroperoxides as follows: cumene hydroperoxide, 0.10 part; diisopropylbenzene hydroperoxide, 0.13 part; triisopropylbenzene hydroperoxide, 0.16 part; tertiary-butylisopropylbenzene hydroperoxide, 0.14 part. The following results were obtained:

| K Tallex Treatment | Hydroperoxide | Conversion, Percent | | |
|---|---|---|---|---|
| | | 2 Hrs. | 7 Hrs. | 24 Hrs. |
| 5.0 millimols KOCl | cumene | 3 | 14 | 51 |
| Do | diisopropylbenzene | 4 | 21 | 71 |
| Do | triisopropylbenzene | 5 | 24 | 50 |
| Do | tert-butylisopropylbenzene | 7 | 34 | 76 |
| No treatment | cumene | 1 | 6 | 16 |
| Do | diisopropylbenzene | 3 | 15 | 41 |
| Do | triisopropylbenzene | 6 | 13 | 14 |
| Do | tert-butylisopropylbenzene | 6 | 21 | 29 |

*Example VIII*

A potassium soap prepared from a commercial grade of hydrogenated wood rosin acid (Staybelite–742) was employed as an emulsifying agent, with and without potassium hypochlorite treatment, in the recipe of Example VII. Polymerization was carried out at 41° F. The following data were obtained:

| K Staybelite Treatment | Hydroperoxide | Conversion, Percent | |
|---|---|---|---|
| | | 2.0 Hrs. | 7.5 Hrs. |
| 4.0 millimol KOCl | cumene | 10 | 41 |
| Do | diisopropylbenzene | 15 | 43 |
| Do | triisopropylbenzene | 19 | 75 |
| Do | tert-butylisopropylbenzene | 21 | 78 |
| No treatment | cumene | 7 | 30 |
| Do | diisopropylbenzene | 8 | 53 |
| Do | triisopropylbenzene | 13 | 67 |
| Do | tert-butylisopropylbenzene | 15 | 68 |

*Example IX*

A hypochlorous acid solution was prepared by passing chlorine into a cold aqueous potassium bicarbonate solution. A sample of potassium soap prepared from Indusoil (see Example I) was treated with variable amounts of the hypochlorous acid solution and the resulting activated emulsifier employed in a series of polymerization runs at 41° F. using the recipe of Example VI. The following results were obtained:

| Run No. | Hypochlorous Acid Treatment | Conversion, Percent, 16.5 Hours |
|---|---|---|
| I | 5 parts K Indusoil+2 millimols HOCl | 21 |
| II | 5 parts K Indusoil+3 millimols HOCl | 24 |
| III | 5 parts K Indusoil+4 millimols HOCl | 24 |
| IV | 5 parts K Indusoil+5 millimols HOCl | 35 |
| V | Untreated K Indusoil [1] | 17.3 |

[1] 16-hour conversion.

Another polymerization was carried out similar to run III except that 0.1 part dihydroxyacetone was charged to the soap solution Otherwise the recipe was the same. A 43 per cent conversion was reached in 16.5 hours.

Example X

In order to demonstrate that the activating effect produced by hypochlorite treatment is not merely a salt activating effect, two polymerization runs were made using the recipe of Example VI. The emulsifier employed was the potassium soap prepared from Indusoil (see Example I). In the first run the emulsifier (5 parts) was activated by treatment with 5 millimols potassium hypochlorite and in the second run 5 millimols potassium chloride was added to the untreated potassium soap. The following results were obtained:

|  | Conversion, Percent, 16.5 Hours |
|---|---|
| K Indusoil+5 millimol KOCl | 52 |
| K Indusoil+5 millimol KCl | 23 |

Example XI

An emulsifier was prepared by treatment of potassium abietate with hypobromous acid in a 1:1 mol basis and the resulting material employed in a butadiene-styrene copolymerization using the recipe of Example VII with cumene hydroperoxide as the oxidant. A run was also made using untreated potassium abietate. The data are recorded below.

|  | Conversion, Percent | | |
|---|---|---|---|
|  | 2 Hrs. | 7 Hrs. | 24 Hrs. |
| K abietate+HOBr | 9 | 13 | 20 |
| K abietate, untreated | 1 | 6 | 16 |

Example XII

A mixed emulsifier comprising potassium abietate and a potassium soap of a fatty acid (KSF flakes) was employed in the following polymerization recipe:

| | Parts by weight |
|---|---|
| Butadiene | 70 |
| Styrene | 30 |
| Water | 192 |
| Methanol | 48 |
| Potassium abietate | 3.5 |
| Potassium fatty acid soap | 1.5 |
| Mercaptan blend¹ | 0.25 |
| Diisopropylbenzene hydroperoxide | 0.10 |
| Activator composition: | |
|   FeSO$_4$.7H$_2$O | 0.14 |
|   Na$_4$P$_2$O$_7$.10H$_2$O | 0.22 |
|   KCl | 0.1 |

¹ See Example I.

The potassium abietate was prepared by neutralization of a commercial grade of abietic acid crystals with potassium hydroxide. In one polymerization run an aqueous solution of this emulsifier (3.5 parts) was treated with 1.0 millimol of aqueous potassium hypochlorite while in a second run untreated potassium abietate was used.

The activator composition was prepared by heating the mixture of ferrous sulfate, sodium pyrophosphate, and potassium chloride in sufficient water to make 14 ml. of solution at a temperature of 140° F. for 40 minutes.

Polymerization was effected at 14° F. The following results were obtained.

|  | Conversion, Percent | | |
|---|---|---|---|
|  | 2 Hrs. | 8 Hrs. | 24 Hrs. |
| K abietate+1.0 millimol KOCl | 5 | 26 | 71 |
| K abietate, untreated | 3 | 21 | 62 |

Example XIII

The recipe of Example XII was employed for carrying out four polymerization runs at 14° F. except that tert.-butylisopropylbenzene hydroperoxide (0.10 part) was substituted for the diisopropylbenzene hydroperoxide and variable amounts of potassium abietate were used. The potassium abietate was prepared by neutralization of abietic acid crystals (Armour-373, gum rosin) with potassium hydroxide. In two runs the potassium abietate was treated with different amounts of potassium hypochlorite while in the other two runs the untreated emulsifier was used. The results are recorded below:

| Potassium Abietate Parts | KOCl | | Conversion, Percent | |
|---|---|---|---|---|
|  | Parts | Millimols | 2.0 Hrs. | 7.0 Hrs. |
| 2.0 | 0.036 | 0.4 | 15 | 44 |
| 3.5 | 0.063 | 0.4 | 13 | 40 |
| 2.0 |  |  | 8 | 39 |
| 3.5 |  |  | 9 | 35 |

Example XIV

Two rosin soaps, prepared by 100 per cent neutralization of Indusoil and Tallex with potassium hydroxide, were treated with potassium hypochlorite at different temperatures and in such quantities that 4.0 millimols of the hypochlorite was used per 5.0 parts of the soap. These emulsifiers were then employed in the following 41° F. polymerization recipe:

| | Parts by weight |
|---|---|
| Butadiene | 72 |
| Styrene | 28 |
| Water, total | 180 |
| Emulsifier | 4.7 |
| Mercaptan blend¹ | 0.25 |
| Trisodium phosphate | 0.5 |
| Cumene hydroperoxide (100%) | 0.10 |
| Dextrose | 1.0 |
| Ferrous sulfate, FeSO$_4$.7H$_2$O | 0.14 |
| Potassium pyrophosphate, K$_4$P$_2$O$_7$ | 0.177 |

¹ See Example I.

The dextrose was digested with 0.04 part potassium hydroxide by heating an aqueous solution of the mixture for five to ten minutes at 175° F. The activator composition was prepared by heating a mixture of the ferrous sulfate, pyrophosphate, and water at 140° F. for 40 minutes. The emulsifier, water, and trisodium phosphate were charged to the reactor, followed by the digested dextrose solution, the activator mixture, and a solution of the mercaptan in the styrene. The temperature was then adjusted to 41° F., the butadiene charged and then the cumene hydroperoxide. The results of a series of polymerizations are shown below, using the rosin soap emulsifiers treated with potassuim hypochlorite at boiling temperature, 70° F. and 32° F.

| Rosin Soap Prepared from— | Temperature of Treatment | Conversion, Percent, at 15.3 Hours |
|---|---|---|
| Indusoil | Boiling | 30 |
| Do | 70° F | 38 |
| Do | 32° F | 38 |
| Tallex | Boiling | 23 |
| Do | 70° F | 26 |
| Do | 32° F | 30 |

As will be evident to those skilled in the art, various modifications of this invention can be made, or followed, in the light of the foregoing disclosure and discussion, without departing from the spirit or scope of the disclosure or from the scope of the claims.

We claim:
1. In the polymerization of a monomeric material comprising 1,3-butadiene while dispersed in an aqueous emulsion in the presence of an emulsifying agent under polymerization conditions to produce synthetic rubber, in the presence of an initiator composition comprising an organic hydroperoxide and an activator-reductant composition, the improvement which comprises incorporating in said aqueous medium prior to said polymerization as an emulsifying agent potassium abietate which has been treated in aqueous solution at a temperature of 65 to 80° F. with 0.2 to 2 millimols of potassium hypochlorite per part by weight of said potassium abietate.

2. In the polymerization of a monomeric material comprising 1,3-butadiene while dispersed in an aqueous emulsion in the presence of an emulsifying agent under polymerization conditions to produce synthetic rubber, in the presence of an initiator composition comprising an organic hydroperoxide and an activator-reductant composition, the improvement which comprises incorporating in said aqueous medium prior to said polymerization as an emulsifying agent a mixture of potassium salts of dehydroabietic, dihydroabietic and tetrahydroabietic acids which has been treated in aqueous solution at a temperature of 65 to 80° F. with 0.2 to 2 millimols of an alkali metal hypochlorite per part by weight of said potassium salts.

3. In the polymerization of a monomeric material comprising 1,3-butadiene while dispersed in an aqueous emulsion in the presence of an emulsifying agent under polymerization conditions to produce synthetic rubber, in the presence of an initiator composition comprising an organic hydroperoxide and an activator-reductant composition, the improvement which comprises incorporating in said aqueous medium prior to said polymerization as an emulsifying agent at least one salt of an alkali metal and a rosin acid of the class consisting of natural rosin acids and hydrogenation, dehydrogenation, and disproportionation reaction products thereof having the same number of carbon atoms per molecule and the same arrangement of carbon atoms as said natural rosin acids, said salt being obtained from treating an alkali metal salt of said acid while in aqueous solution at a temperature between 30 and 220° F. with a hypochlorite selected from the group consisting of hypochlorous acid and its alkali metal salts in an amount between 0.05 and 6 millimols per part by weight of said salt.

4. The process of claim 3 in which a resulting reaction mixture of said rosin acid salt and said hypochlorite is added to said aqueous medium.

5. The process of claim 3 in which a resulting reaction mixture of said rosin acid salt and said hypochlorite is acidified, a resulting treated rosin acid is separated, said separated rosin acid is converted to a salt of an alkali metal, and said resulting salt is added to said aqueous medium as an emulsifying agent.

6. The process of claim 3 in which said hypohalogen compound is sodium hypochlorite.

7. The process of claim 3 in which said hypohalogen compound is potassium hypochlorite.

8. The process of claim 3 in which said rosin acid soap is a soap of abietic acid.

9. The process of claim 3 in which said rosin acid soap is a soap of tetrahydroabietic acid.

10. The process of claim 3 in which said rosin acid soap is a soap of dehydroabietic acid.

11. In the polymerization of an unsaturated organic compound containing an active $CH_2=C<$ group, and polymerizable in aqueous emulsion to produce a linear polymer of high molecular weight, while dispersed in an aqueous medium at a polymerization temperature in the presence of an emulsifying agent and in the presence of an initiator composition comprising an organic hydroperoxide and an activator-reductant composition, the improvement which comprises incorporating in said aqueous medium prior to said polymerization a salt of an alkali metal and at least one rosin acid of the class consisting of natural rosin acids and hydrogenation, dehydrogenation, and disproportionation reaction products thereof having the same number of carbon atoms per molecule and the same arrangement of carbon atoms as said natural rosin acids, said salt being obtained from treating an alkali metal salt of said acid while in aqueous solution at a temperature between 30 and 220° F. with a hypohalogen compound selected from the group consisting of hypohalogen acids and their alkali metal salts in an amount between 0.05 and 6 millimols per part by weight of said salt.

12. In the polymerization of an unsaturated organic compound containing an active $CH_2=C<$ group, and polymerizable in aqueous emulsion to produce a linear polymer of high molecular weight, while dispersed in an aqueous medium at a polymerization temperature in the presence of an emulsifying agent, the improvement which comprises incorporating in said aqueous medium prior to said polymerization a salt of an alkali metal and at least one rosin acid of the class consisting of natural rosin acids and hydrogenation, dehydrogenation, and disproportionation reaction products thereof having the same number of carbon atoms per molecule and the same arrangement of carbon atoms as said natural rosin acids, said salt being obtained from treating an alkali metal salt of said acid while in aqueous solution at a temperature between 30 and 220° F. with a hypohalogen compound selected from the group consisting of hypohalogen acids and their alkali metal salts in an amount between 0.05 and 6 millimols per part by weight of said salt.

13. The process of claim 11 in which a resulting reaction mixture of said rosin acid salt and said hypochlorite is added to said aqueous medium.

14. The process of claim 11 in which a resulting reaction mixture of said rosin acid salt and said hypochlorite is acidified, a resulting treated rosin acid is separated, said separated rosin acid is converted to a salt of an alkali metal, and said resulting salt is added to said aqueous medium as an emulsifying agent.

15. An improved process for producing synthetic rubber by polymerizing a monomeric material comprising a major amount of 1,3-butadiene while dispersed in an aqueous emulsion in the presence of an emulsifying agent at a polymerization temperature and in the presence of a polymerization initiator composition comprising an organic hydroperoxide and an activator-reductant composition, which comprises polymerizing said monomeric material under said conditions in the presence of an emulsifying agent comprising potassium abietate which has been treated in aqueous solution at a temperature of 65 to 80° F. with 0.2 to 2 millimols of sodium hypochlorite per part by weight of said potassium abietate.

16. A process for the polymerization of a monomeric material comprising a major amount of a conjugated diene and polymerizable while dispersed in an aqueous medium, which comprises polymerizing such a monomeric material while dispersed in an aqueous medium at a polymerization temperature in the presence of an initiator composition comprising an organic hydroperoxide and an activator-reductant composition and also in the presence of an emulsifying agent comprising an alkali metal salt of abietic acid which has been treated in aqueous solution at a temperature of 30 to 220° F. with 0.05 to 6 millimols, per part by weight of said abietic acid salt, of a hypochlorite.

17. A process for the polymerization of a monomeric material comprising an organic compound containing an active $CH_2=C<$ group and polymerizable while dispersed in an aqueous medium, which comprises polymerizing such a monomeric material while dispersed in an aqueous medium at a polymerization temperature in the presence of an initiator composition comprising an organic hydroperoxide and an activator-reductant composition and also in the presence of an emulsifying agent comprising an alkali metal salt of abietic acid which has been treated in aqueous solution at a temperature of 30 to 220° F. with 0.05 to 6 millimols, per part by weight of said abietic acid salt, of a hypohalogen compound selected from the group consisting of hypohalogen acids and their alkali metal salts.

18. In the polymerization of a monomeric material comprising 1,3-butadiene while dispersed in an aqueous emulsion in the presence of an emulsifying agent under polymerization conditions to produce synthetic rubber, in the presence of an initiator composition comprising an organic hydroperoxide and an activator-reductant composition, the improvement which comprises incorporating in said aqueous medium prior to said polymerization as an emulsifying agent at least one salt of an alkali metal and a rosin acid of the class consisting of natural rosin acids and hydrogenation, dehydrogenation, and disproportionation reaction products thereof having the same number of carbon atoms per molecule and the same arrangement of carbon atoms as said natural rosin acids, said salt being obtained from treating an alkali metal salt of said acid while in aqueous solution at a temperature between 30 and 220° F. with a hypobromite selected from the group consisting of hypobromous acid and its alkali metal salts in an amount between 0.05 and 6 millimols per part by weight of said salt.

References Cited in the file of this patent

UNITED STATES PATENTS

| Number | Name | Date |
|---|---|---|
| 1,887,246 | Phyala | Nov. 8, 1932 |
| 2,369,409 | Ross | Feb. 13, 1945 |
| 2,434,643 | Drake | Jan. 20, 1948 |

OTHER REFERENCES

Shearon, Jr. et al.: Ind. & Eng. Chem., vol. 40, No. 5, May 1948, pp. 769–777.